United States Patent [19]
Marman et al.

[11] Patent Number: 5,804,891
[45] Date of Patent: Sep. 8, 1998

[54] BATTERY SAVING SWITCHING MECHANISM

[75] Inventors: Douglas H. Marman, Ridgefield, Wash.; Kenneth David Fisch; Brian B. Walch, both of Hickory, N.C.

[73] Assignee: Sentrol, Inc., Tualatin, Oreg.

[21] Appl. No.: 825,511

[22] Filed: Mar. 31, 1997

[51] Int. Cl.[6] ....................................................... H02J 9/06
[52] U.S. Cl. .............................. 307/66; 307/64; 307/71; 320/116; 320/117; 340/506; 340/509
[58] Field of Search ................................. 307/66, 64, 71; 320/116, 117; 340/693, 506, 509

[56] References Cited

U.S. PATENT DOCUMENTS

| | | | |
|---|---|---|---|
| 3,603,973 | 9/1971 | Hough | 307/66 |
| 3,746,878 | 7/1973 | Viger | 307/66 |
| 4,143,283 | 3/1979 | Graf et al. | 307/66 |
| 5,121,046 | 6/1992 | McCullogh | 320/117 |
| 5,406,254 | 4/1995 | Le Nay et al. | 340/501 |
| 5,418,402 | 5/1995 | Fujiwara | 307/71 |

*Primary Examiner*—Ronald W. Leja
*Assistant Examiner*—Albert W. Paladini
*Attorney, Agent, or Firm*—Stoel Rives LLP

[57] ABSTRACT

An intelligent switching mechanism for the backup batteries of an alarm system is disclosed. When AC input power has failed but no alarm has been declared, the batteries are switched into a parallel configuration, which is sufficient to supply the control panel, so that the batteries are drained in tandem. When AC input power has failed and an alarm has been declared, the batteries are switched into a series configuration to supply power at the higher voltage required by the alarm annunciators.

11 Claims, 1 Drawing Sheet

5,804,891

BATTERY SAVING SWITCHING MECHANISM

TECHNICAL FIELD

The present invention is a battery saving switching mechanism for implementation in an electrical system having voltage requirements that vary with system state.

BACKGROUND OF THE INVENTION

The present invention finds its most immediate application in a fire alarm system having many sensors and alarm annunciators, such as bells or sirens, communicating with a fire alarm control panel. In most countries, including the United States, such a system is required to have backup batteries that can provide electrical power for a specified time span when the regular supply of electrical power (AC input power) fails.

In a fire alarm system it is typical for the logic circuitry of the control panel to operate at a relatively low voltage, for example 5 VDC or 12 VDC, and for the alarm annunciators to operate at a higher voltage, for example 24 VDC. The annunciators operate at a higher voltage because in a large, centralized alarm system, an annunciator may be 100 yards or more away from the control panel. It is, therefore, desirable to use annunciators that require a relatively high voltage and consequently draw less current to permit the use of thinner, less expensive wires.

Generally, the backup batteries consist of a pair of batteries connected in series across the fire alarm control panel. The lower voltage needed for the control panel logic circuitry is derived by a voltage regulator or by voltage dividers. These devices tend to be quite inefficient, wasting a large portion of the energy delivered to the control panel.

The backup batteries should have sufficient energy storage capacity to power the system when it is in a nonalarm state for a specified time span. They should also have sufficient energy storage capacity to power the system when it is in an alarm state for an additional, typically much shorter, specified time span. The energy storage requirements of the backup batteries may be determined as follows:

Total backup battery energy storage requirement=
$T_{cp} * I_{cp} * V_{cp} + T_a * I_a * V_a$
where:

$T_{cp}$=battery backup time span requirement for control panel $I_{cp}$=current draw of control panel $V_{cp}$=voltage required by control panel $T_a$=battery backup time span requirement for annunciator $I_a$=current draw of annunciator $V_a$=voltage required by annunciator.

It is typical for $T_{cp}$=24 hours, $I_{cp}$=175 milliamps, $V_{cp}$=24 volts, $T_a$=0.167 hours, $I_a$=6 amps and $V_a$=24 volts, yielding a charge storage requirement for each of a pair of 12 volt batteries connected in series to equal 5.2 amp hours.

SUMMARY OF THE INVENTION

The present invention is a backup battery saver switching mechanism for use in an electrical system (such as a fire alarm system) drawing AC input power and having first and second subsystems. The first subsystem (such as a control panel) is designed to require a first voltage; and the second subsystem (such as a set of alarm annunciators) may be in an "on" state (when an alarm has been declared), requiring a second input voltage that is greater than the first input voltage, or be in an "off state," requiring no input voltage. When the second subsystem is in its off state and the AC input power has failed, the switching mechanism configures the batteries in parallel so that they jointly provide power at the first input voltage. Otherwise, the switching mechanism configures the batteries in series to jointly provide power at the first input voltage and to accept a battery charging input, also at the first input voltage. A first one of the batteries is configured so that it continues to supply power at the first voltage to the first subsystem when the second subsystem is in its on state and AC input power has failed.

If the present invention were implemented in the system postulated in the "Background of the Invention" portion of this application the batteries would be connected in parallel when there was no alarm condition and AC input power had failed. If, as is typical, $I_{cp}$ does not increase as a result of the implementation of the invention, the two batteries would require at most 3.1 amp hours of charge storage capacity. This reduction in charge storage requirement results in the ability to use 4 amp hour batteries rather than 7 amp hour batteries. This reduction of charge storage requirement produces a savings of about $10.00 at typical 1997 battery prices. Similarly, where there is a 60 hour requirement or for larger systems requiring more zones the monetary savings would typically amount to about $30.00 to $45.00.

Additional objects and advantages of this invention will be apparent from the following detailed description of a preferred embodiment thereof which proceeds with reference to the accompanying drawing.

DETAILED DESCRIPTION OF PREFERRED EMBODIMENT

Figure 1:
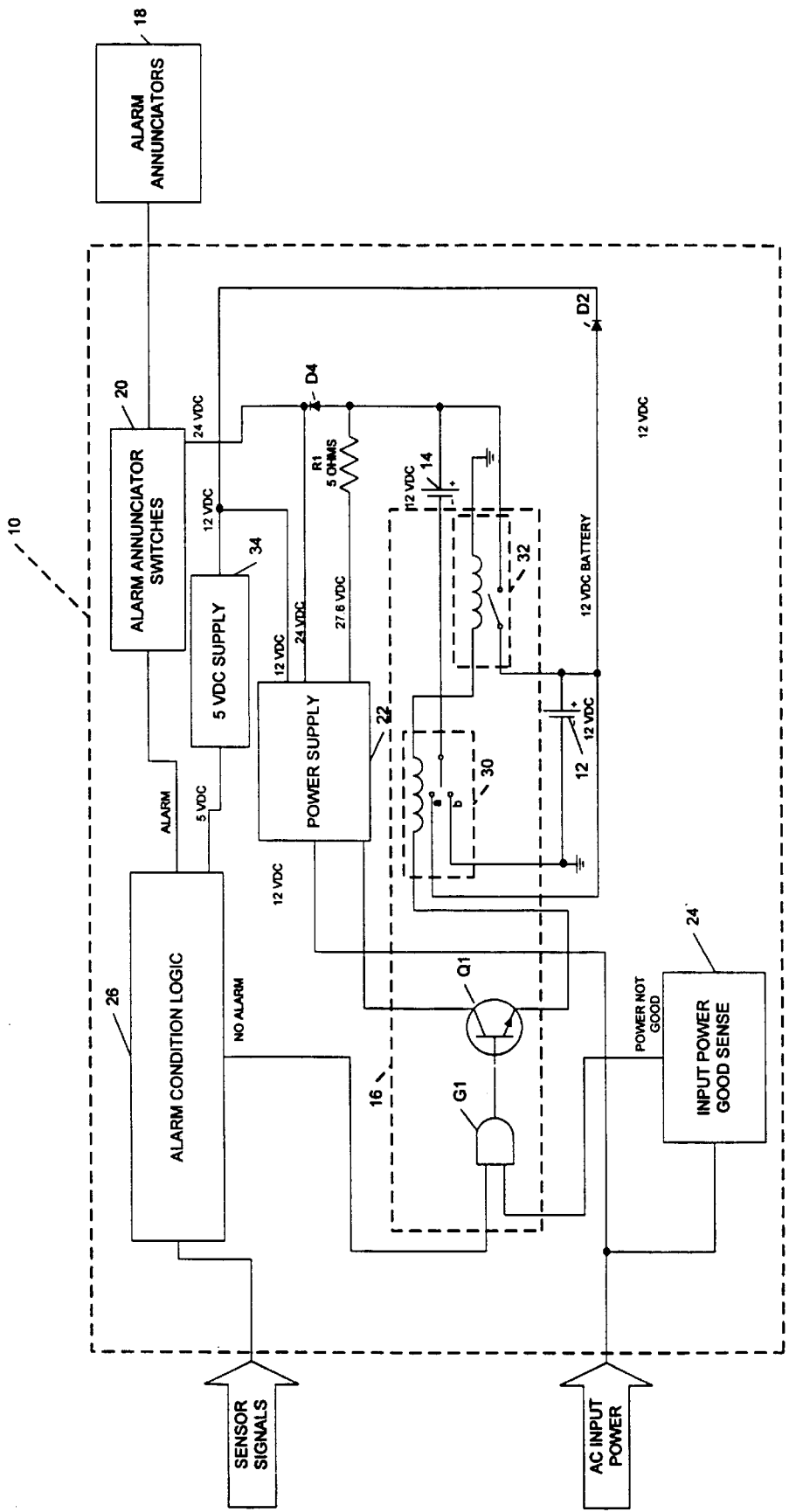
FIG. 1 is a schematic diagram of an electrical system that includes a switching mechanism according to the present invention.

FIG. 1 shows a fire alarm system 10 having a 12 VDC first backup battery 12 and a 12 VDC second backup battery 14. Batteries 12 and 14 are dynamically configured by a switching mechanism 16 that is constructed in accordance with the present invention. When system 10 is in not in an alarm state and when the AC input power is unavailable, switching mechanism 16 configures batteries 12 and 14 in parallel so that they are both drained equally by alarm control system 10, which requires 12 VDC. Otherwise, switching mechanism 16 configures batteries 12 and 14 in series. While the usual supply of power is available, the series configuration allows for the convenient charging of batteries 12 and 14. When the usual supply of power is not available and system 10 is in an alarm condition, the series configuration is necessary to supply power to a set of alarm annunciators 18, which require 24 VDC and which are switched on in response to an alarm condition by a set of alarm annunciator switches 20.

A power supply 22 of system 10 receives AC input power. Power supply 22 produces 12 VDC, 24 VDC, and 27.6 VDC from this source. System 10 may include a separate printed circuit board for power supply 22.

A power good sense block 24 issues a "power not good" output when the usual supply of power is inadequate. An alarm condition logic block 26 examines a set of sensor signals received from a suite of external sensors (not shown) and emits a "no alarm" signal when indicated by all of the sensor signals by sending the "no alarm" output of block 26 high. A two-input AND gate G1 comprises a logic circuit for designating the system state of alarm system 10. The inputs of AND gate G1 are electrically connected with the "power not good" output of block 24 and the "no alarm" output of block 26. A "power not good" signal and a "no alarm" signal drive the output of AND gate G1 to its high state, which commands a transistor Q1 to its "on" state. If the alarm output of block 26 is low, this constitutes an alarm signal, which drives gate G1 low.

In this state, Q1 drives in tandem a first relay 30 to contact its "b" pole and a second relay 32 to its closed state, thereby placing batteries 12 and 14 in a parallel configuration. Whenever there is either an alarm signal or a power good signal, the output of AND gate G1 goes low driving transistor Q1 to its "off" state, thereby causing first relay 30 to contact its "a" pole and second relay 32 to open. This places batteries 12 and 14 in a series configuration. When batteries 12 and 14 are in this configuration and AC power is unavailable, first battery 12 provides 12 VDC to power a 5 VDC power supply 34 that powers alarm condition logic block 26.

A diode D2 prevents battery 12 from draining power from the 12 VDC output of power supply 22 during normal operation, and a diode D4 prevents batteries 12 and 14 from draining power from the 24 VDC output of power supply 22 during normal operation. Batteries 12 and 14 are charged from the 27.6 VDC output of power supply 22. A 5 ohm current limiting resistor R1 protects batteries 12 and 14 from a harmfully large battery charge current than manageable demand for current from batteries 12 and 14.

It will be obvious to those having skill in the art that many changes may be made to the details of the above-described embodiment of this invention without departing from the underlying principles thereof. The scope of the present invention should, therefore, be determined only by the following claims.

We claim:

1. A fire alarm system that is normally powered by AC line power, or when the AC line power fails, by a battery backup apparatus, the fire alarm system including a control panel that draws a lower amount of current at a lower voltage and alarm annunciators that draw a higher amount of current at a higher voltage, an improved battery backup apparatus comprising:

first and second backup batteries, which when connected in a parallel configuration have a first ampere-hour capacity capable of providing the lower voltage at the lower amount of current for powering the control panel for at least a first predetermined time period, and when connected in a series configuration have a second ampere-hour capacity capable of providing the higher voltage at the higher amount of current for powering the alarm annunciators for at least a second predetermined time period that is shorter than the first predetermined time period, the second ampere-hour capacity being insufficient for powering the control panel for at least the first predetermined time period;

an AC line power sensing circuit for issuing a power not good signal in response to an absence of AC line power;

an alarm condition logic circuit for detecting whether an alarm condition exists and issuing a no alarm signal when no alarm condition exists;

a logic circuit issuing a first switching state signal in response to receiving the power not good signal and the no alarm condition signal and otherwise issuing a second switching state signal; and a switching mechanism receiving the first switching state signal and switching the first and second backup batteries into the parallel configuration for powering the control panel.

2. The apparatus of claim 1 in which the switching mechanism receives the second switching state signal and switches the first and second backup batteries into the series configuration for powering the control panel and the alarm annunciators.

3. The apparatus of claim 1 in which the logic circuit includes an AND gate.

4. The apparatus of claim 1 in which the switching mechanism includes a set of relay contacts.

5. The apparatus of claim 1 in which the first and second backup batteries each provide the lower voltage, which is about 12 volts.

6. The apparatus of claim 1 in which the lower voltage ranges from about 5 volts DC to about 13.8 volts DC.

7. The apparatus of claim 1 in which the higher voltage ranges from about 12 volts DC to about 27.6 volts DC.

8. The apparatus of claim 1 in which the first predetermined time period is about 24 hours and the second predetermined time period is about 10 minutes.

9. In a fire alarm system that is normally powered by AC line power, or when the AC line power fails, by a battery backup apparatus, and in which the fire alarm system includes a control panel that draws a lower amount of current at a lower voltage and alarm annunciators that draw a higher amount of current at a higher voltage, an improved battery backup method comprising:

providing first and second backup batteries, which when connected in a parallel configuration have a first ampere-hour capacity capable of providing the lower voltage at the lower amount of current for powering the control panel for at least a first predetermined time period, and when connected in a series configuration have a second ampere-hour capacity capable of providing the higher voltage at the higher amount of current for powering the alarm annunciators for at least a second predetermined time period that is shorter than the first predetermined time period, the second ampere-hour capacity being insufficient for powering the control panel for at least the first predetermined time period;

generating a power not good signal in response to an absence of AC line power;

generating a no alarm signal when no alarm condition exists;

issuing a first switching state signal in response to receiving the power not good signal and the no alarm condition signal; and switching in response to the first switching state signal the first and second backup batteries into the parallel configuration for powering the control panel.

10. The method of claim 9 further including issuing a second switching state signal in response to an absence of at least one of the power not good signal and the no alarm condition signal and switching in response to the second switching state signal the first and second backup batteries into the series configuration for powering the control panel and the alarm annunciators.

11. The apparatus of claim 9 in which issuing the first switching state signal includes performing a logical AND function.

* * * * *